United States Patent
Carretero Chamarro et al.

(10) Patent No.: US 12,238,846 B2
(45) Date of Patent: Feb. 25, 2025

(54) INDUCTION DEVICE

(71) Applicant: BSH Hausgeräte GmbH, Munich (DE)

(72) Inventors: Claudio Carretero Chamarro, Saragossa (ES); Pablo Jesus Hernandez Blasco, Saragossa (ES); Javier Lasobras Bernad, Ejea De los Caballeros (ES); Ignacio Lope Moratilla, Saragossa (ES); Damaso Martin Gomez, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 953 days.

(21) Appl. No.: 17/282,798

(22) PCT Filed: Oct. 17, 2019

(86) PCT No.: PCT/IB2019/058847
§ 371 (c)(1),
(2) Date: Apr. 5, 2021

(87) PCT Pub. No.: WO2020/079625
PCT Pub. Date: Apr. 23, 2020

(65) Prior Publication Data
US 2022/0007470 A1    Jan. 6, 2022

(30) Foreign Application Priority Data
Oct. 18, 2018   (ES) ................. ES201831013

(51) Int. Cl.
*H05B 6/12* (2006.01)
*G01K 1/02* (2021.01)
(Continued)

(52) U.S. Cl.
CPC .......... *H05B 6/1272* (2013.01); *G01K 1/026* (2013.01); *G01K 7/22* (2013.01); *G01V 3/10* (2013.01);
(Continued)

(58) Field of Classification Search
CPC .............. H05B 6/1272; H05B 2213/07; H05B 2213/05; H05B 6/062; G01K 1/026; G01K 7/22; G01V 3/10; F24C 7/067
See application file for complete search history.

(56) References Cited

U.S. PATENT DOCUMENTS

| | | | | |
|---|---|---|---|---|
| 4,778,978 A | * | 10/1988 | Schreder | F24C 7/067 219/448.11 |
| 5,900,174 A | * | 5/1999 | Scott | H05B 3/746 219/626 |

(Continued)

FOREIGN PATENT DOCUMENTS

| | | |
|---|---|---|
| EP | 2312908 A1 | 4/2011 |
| ES | 2641714 T3 | 11/2017 |

(Continued)

OTHER PUBLICATIONS

Machine Translation of Santolaria (EP 2312908), performed one Feb. 15, 2024 (Year: 2017).*

(Continued)

*Primary Examiner* — Brian W Jennison
(74) *Attorney, Agent, or Firm* — Michael E. Tschupp; Andre Pallapies; Brandon G. Braun (57) ABSTRACT

An induction device includes an induction unit including a sensor unit, which is arranged above the induction unit in a mounted position and includes a plurality of presence sensor elements arranged in a distributed manner and configured to detect a sensor parameter in the form of a presence parameter of an object. A control unit is provided to analyze the sensor parameter.

13 Claims, 7 Drawing Sheets

(51) Int. Cl.
*G01K 7/22* (2006.01)
*G01V 3/10* (2006.01)
(52) U.S. Cl.
CPC ...... *H05B 2213/03* (2013.01); *H05B 2213/05* (2013.01); *H05B 2213/07* (2013.01)

(56) References Cited

U.S. PATENT DOCUMENTS

| | | | |
|---|---|---|---|
| 6,184,501 B1 | 2/2001 | Zapf | |
| 2014/0305928 A1* | 10/2014 | Thompson | H05B 3/74 219/448.12 |
| 2015/0341990 A1* | 11/2015 | Nagata | H05B 6/062 219/622 |
| 2018/0168005 A1* | 6/2018 | Yun | H05B 6/065 |

FOREIGN PATENT DOCUMENTS

| | | |
|---|---|---|
| JP | H07307196 A | 11/1995 |
| WO | 2016046676 A1 | 3/2016 |
| WO | 2018029002 A1 | 2/2018 |

OTHER PUBLICATIONS

National Search Report ES 201831013 dated Apr. 2, 2019.
International Search Report PCT/IB2019/058847 dated Dec. 20, 2019.

* cited by examiner

INDUCTION DEVICE

CROSS-REFERENCES TO RELATED APPLICATIONS

This application is the U.S. National Stage of International Application No. PCT/IB2019/058847, filed Oct. 17, 2019, which designated the United States and has been published as International Publication No. WO 2020/079625 A1 and which claims the priority of Spanish Patent Application, Serial No. P201831013, filed Oct. 18, 2018, pursuant to 35 U.S.C. 119 (a)-(d).

BACKGROUND OF THE INVENTION

The invention relates to an induction device.

An induction device with a plurality of induction units arranged in the manner of a matrix and with a sensor unit for detecting a sensor parameter, which is in the form of a presence parameter of at least one object and in particular of at least one cookware item, is already known from the prior art. The induction units are part of the sensor unit and are configured as sensor elements. The induction units are briefly activated to detect the cookware item. Further to the brief activation of the induction units a control unit analyzes an impedance of a respective induction unit. If the impedance of a respective induction unit is within a predefined range, the control unit activates the corresponding induction unit to heat the positioned cookware item. A detection resolution capacity is relatively crude, thereby excluding detection of small objects. There is also the risk that, when the induction unit is activated, energy is transferred to the cookware item, even though an energy transfer is not desirable at this point.

BRIEF SUMMARY OF THE INVENTION

It is the object of the invention in particular to provide a generic device with improved properties in respect of a detection of particular parameters.

The invention is based on an induction device, in particular an induction cooktop device, with at least one induction unit, in particular with at least one induction heating unit, with at least one sensor unit, which is provided to detect at least one sensor parameter, and with at least one control unit, which is provided to analyze the sensor parameter.

It is proposed that in a mounted position the sensor unit is arranged above the induction unit and has a plurality of presence sensor elements arranged in a distributed manner, in particular in the manner of a matrix, being provided to detect at least one sensor parameter in the form of a presence parameter of at least one object, in particular of at least one positioned cookware item, and/or a plurality of activity sensor elements arranged in a distributed manner, in particular in the manner of a matrix, being provided to detect at least one sensor parameter in the form of an activity parameter of the induction unit, and/or a plurality of temperature sensor elements arranged in a distributed manner, in particular in the manner of a matrix, being provided to detect at least one sensor parameter in the form of a temperature parameter of at least one unit.

The inventive embodiment in particular allows advantageous detection of particular parameters. By arranging the sensor unit above the induction unit it is possible in particular to achieve a compact configuration. In particular it allows precise detection, in particular due to the spatial proximity of the sensor unit to the induction unit and/or a placement plate and/or a cookware item. The modular and/or independent nature of the sensor unit relative to the induction unit in particular allows independence of the sensor unit and the induction unit, thereby preventing any change to the sensor unit and/or the induction unit affecting the induction unit and/or the sensor unit.

The presence sensor elements in particular allow precise detection of positioned cookware and/or the object, in particular when there is a much smaller, in particular unwanted, transfer of energy to the object to be detected, compared with sensor elements formed by the induction unit. The plurality of presence sensor elements in particular allows a high resolution capacity to be achieved, allowing even small objects and/or cookware items in particular to be detected easily.

The activity sensor elements in particular allow precise detection of any activity of the induction unit, thereby in particular preventing erroneous activation of an induction unit and/or providing a high safety standard. In particular by only activating required induction units it is possible to achieve an environmentally friendly and/or economical embodiment, which is therefore in particular extremely convenient for the operator. In particular there is no need for an additional circuit for detecting an electric voltage and/or an electric current of the induction unit, thereby keeping costs low.

The temperature sensor elements in particular allow precise detection of a temperature of the unit, allowing optimal cooking results in particular to be achieved. Overheating of a unit, which could in particular be the induction unit and/or the placement plate, in particular can be avoided, resulting in particular in a durable embodiment. In particular an item being cooked is prevented from burning and/or boiling dry, which is in particular convenient for the operator.

An "induction device", in particular an "induction cooktop device" refers in particular to at least one part, in particular a sub-assembly, of an induction appliance, in particular of an induction cooktop. The induction device is preferably provided to transfer energy inductively to at least one item. The item could be for example a self-driving work implement and/or a hand tool and/or a shutter and/or a remote control unit. The item is preferably a cookware item. In particular the item can be identical to the object which is provided in particular for detection using the plurality of presence sensor elements, in particular if the object is provided to transfer energy inductively.

The induction device configured in particular as an induction cooktop device could have for example at least one placement plate, in particular configured as a cooktop plate, which could be provided in particular for cookware placement, in particular for the purpose of heating the cookware, and, in particular together with at least one housing unit of the induction device, could define and/or form at least one outer housing, in particular at least one cooktop outer housing in particular of at least one induction cooktop comprising the induction device. In particular the induction device, which in particular comprises the placement plate configured in particular as a cooktop plate, could be provided for delivery and/or sale, in particular together with the placement plate configured in particular as a cooktop plate.

Alternatively the induction device configured in particular as an induction cooktop device could be for example without a placement plate and be provided in particular for arrangement below a placement plate configured in particular as a worktop and advantageously as a kitchen worktop. In particular the induction device, which could be in particular without a placement plate configured in particular as a worktop, could be provided for delivery and/or sale separately from at least one placement plate configured in particular as a worktop. The placement plate configured in particular as a worktop and advantageously as a kitchen worktop could be for example part of at least one cooking system, which could comprise in particular the induction device and in particular the placement plate configured in particular as a worktop and advantageously as a kitchen worktop.

In particular the induction device has at least two, advantageously at least three, particularly advantageously at least four, preferably at least eight and particularly preferably a plurality of induction units. The induction units are arranged in particular in a distributed manner and advantageously in the manner of a matrix. An "induction unit" in this context refers in particular to a unit, which, in at least one operating state, provides energy, in particular in the form of an electromagnetic alternating field, advantageously for the purpose of transferring energy inductively to at least one item, in particular as a function of activation of the induction unit by the control unit. The induction unit is advantageously configured as an induction heating unit and, in at least one operating state, supplies energy in particular to at least one item configured as a cookware item for the purpose of heating the cookware item, in particular as a function of activation of the induction unit by the control unit.

In particular the control unit is provided to control and/or regulate at least the induction unit. A "control unit" refers in particular to an electronic unit which, in at least one operating state, controls and/or regulates at least one appliance function and/or at least one appliance main function, in particular an inductive transfer of energy to at least one item, advantageously the heating of at least one cookware item. The control unit in particular has at least one computation unit and, in particular in addition to the computation unit, at least one storage unit, in which in particular at least one control and/or regulation program is stored, which is provided in particular for execution by the computation unit. In particular the control unit is provided to control and/or regulate at least one in particular electrical and/or electronic cooktop unit that is different from the control unit. A "cooktop unit" refers in particular to at least one part, in particular a sub-assembly, of a cooktop, in particular of an induction cooktop. At least one cooktop unit could be for example at least one operator interface and/or the induction unit and/or at least one inverter and/or at least one extractor unit and/or at least one cooktop electronics unit and/or the sensor unit.

A "sensor unit" refers in particular to a unit which has at least one sensor element configured as a detector to detect at least one sensor parameter and which is provided in particular to output a value characterizing the sensor parameter, the sensor parameter advantageously being a physical and/or chemical variable. For example the sensor unit could actively detect the sensor parameter in at least one operating state, in particular by generating and emitting a measurement signal, in particular an electrical and/or optical measurement signal. Alternatively or additionally the sensor unit could passively detect the sensor parameter in at least one operating state, in particular by capturing at least one property change of at least one sensor part and/or of the sensor element. In particular at least a majority and advantageously each of the sensor elements of the plurality of sensor elements has at least one detector for detecting at least one sensor parameter.

"At least a majority" of a number of elements refers in particular to a portion of at least 70%, in particular at least 80%, advantageously at least 90% and preferably at least 95% of the number of elements. A "plurality" of items, in particular of sensor elements and/or induction units refers in particular to a number of at least six, in particular at least nine, advantageously at least twelve, particularly advantageously at least sixteen, preferably at least twenty-five, particularly preferably at least thirty-six, preferentially at least forty-nine and particularly preferentially at least sixty-four items.

The expression that in a mounted position the sensor unit is arranged "above" the induction unit means in particular that in a mounted position the sensor unit is at a greater distance from a base than the induction unit in at least one vertical direction and/or in a mounted position the sensor unit is at a shorter distance from at least one positioned cookware item and/or the placement plate than the induction unit in at least one vertical direction. In a mounted position the vertical direction is aligned in particular at least substantially parallel to a gravity direction and/or at least substantially perpendicular to a main extension plane of the placement plate. The base could be for example a bottom and/or a floor and/or a placement surface.

"Substantially parallel" here refers in particular to an alignment of a direction relative to a reference direction, in particular in one plane, the direction deviating by in particular maximum 8°, advantageously maximum 5° and particularly advantageously maximum 2° from the reference direction. The expression "substantially perpendicular" here refers in particular to an alignment of a direction relative to a reference direction, the direction and the reference direction being at an angle of 90°, in particular when viewed in one plane, and the angle having a maximum deviation of in particular maximum 8°, advantageously maximum 5° and particularly advantageously maximum 2°. A "main extension plane" of an item refers in particular to a plane that is parallel to a largest side face of a smallest imaginary geometric cuboid that still encloses the item completely and runs in particular through the center point of the cuboid.

For example in a mounted position the sensor unit could be arranged in particular on a side of the placement plate facing away from the induction unit and/or facing the cookware item. In a mounted position the sensor unit is advantageously arranged on a side of the placement plate facing the induction unit and/or facing away from the cookware item. In a mounted position the sensor unit is arranged between the placement plate and the induction unit, in particular when viewed in the vertical direction. For example in a mounted position the sensor unit could be arranged in close proximity above the induction unit and could in particular be positioned on the induction unit. For example the sensor unit could have at least one substrate, on which the plurality of sensor elements of the sensor unit could be arranged in at least one mounted state. The substrate could be in the manner of a plate for example and could be much thinner than a longitudinal extension and/or transverse extension of the substrate. For example the substrate could be formed at least largely of at least one plastic, for example polyimide. The substrate could be for example a circuit board and/or a foil. In particular at least one, in particular at least a majority and advantageously each of the sensor elements, in particular the activity sensor elements and/or the presence sensor elements and/or the temperature sensor elements, could be arranged in the manner of a conductor path on the substrate. At least one, in particular at least a majority and advantageously each of the sensor elements, in particular the activity sensor elements and/or the presence sensor elements and/or the temperature sensor elements, could be made in particular at least largely of copper and/or aluminum and/or nickel.

Alternatively or additionally in a mounted position the sensor unit could be arranged in particular in close proximity to the placement plate and advantageously on the placement plate. For example in a mounted position the sensor unit could in particular be fastened to the placement plate, in particular by means of at least one force-fit and/or form-fit and or advantageously material-fit connection and be embodied for example as at least one coating. "At least largely" refers in particular to a portion, in particular a portion by mass and/or volume, of at least 70%, in particular at least 80%, advantageously at least 90% and preferably at least 95%.

A plurality of items, in particular sensor elements and/or induction units, arranged "in a distributed manner" means in particular that when looking at a perpendicular projection of the items into one plane at least a first of the items is at a distance from at least a second of the items of maximum 300%, in particular maximum 250%, advantageously maximum 200%, particularly advantageously maximum 175%, preferably maximum 150% and particularly preferably maximum 125% of a maximum extension of a larger of the items in the plane and the first item is at a distance from at least a third of the items of at least 300%, in particular at least 350%, advantageously at least 400%, particularly advantageously at least 450%, preferably at least 500% and particularly preferably at least 600% of a maximum extension of a larger of the items in the plane. In particular when looking at a perpendicular projection of the items into one plane at least 5, in particular at least 10, advantageously at least 20, particularly advantageously at least 30, preferably at least 50 and particularly preferably at least 60 items are arranged on a surface of 130 times the surface extension of one of the items in the plane. A "distance" between at least two items here and in the following refers in particular to an extension from a geometric center point and/or center of gravity of one of the items to a geometric center point and/or center of gravity of a further item.

A plurality of items, in particular sensor elements and/or induction units, arranged "in the manner of a matrix" refers in particular to a plurality of items arranged in a regular manner, advantageously in the form of rows and columns and preferably in the form of a matrix with rows and columns. In particular the rows and columns of the matrix define at least two axes of the matrix. The axes of the matrix could be aligned for example obliquely relative to one another. The axes of the matrix are advantageously aligned at least substantially perpendicular to one another. In particular distances between in particular directly adjacent rows of the matrix and/or between in particular directly adjacent columns of the matrix could be different. The distances between in particular directly adjacent rows of the matrix and/or between in particular directly adjacent columns of the matrix are advantageously at least substantially and advantageously exactly identical, when manufacturing tolerances are taken into account. The matrix could be a mathematical matrix for example and could be described in particular by means of matrices. For example a number of columns of the matrix and a number of lines of the matrix could be different. A number of columns of the matrix and a number of lines of the matrix is advantageously at least substantially and advantageously exactly identical. The matrix of items could be for example a 3×3, in particular a 4×4, advantageously a 5×5, particularly advantageously a 6×6, preferably a 7×7 and particularly preferably an 8×8 matrix of items. The matrix can particularly advantageously be an X×Y matrix, in which at least one of the variables X and Y has a value of at least three, in particular at least four, advantageously at least five, particularly advantageously at least eight, preferably at least twelve and particularly preferably at least fifteen.

A "presence sensor element" refers in particular to a sensor element which, in at least one operating state, detects at least a presence and/or absence of at least one object. In particular the presence parameter of the object characterizes at least a presence and/or absence of the object. In particular in addition to a presence and/or absence of at least one object the presence sensor element could be provided for example to detect at least a shape and/or at least a configuration and/or at least a size and/or at least a suitability for induction and/or at least a material of the object. At least one object could be for example flatware and/or kitchenware and/or a token. At least one object is advantageously a cookware item, which is arranged, in particular positioned, above the induction unit and advantageously above the placement plate, in particular for heating.

An "activity sensor element" refers in particular to a sensor element which, in at least one operating state, detects at least one activity state of the induction unit. In particular the activity parameter of the induction unit characterizes at least one activity state of the induction unit. For example the activity sensor element could detect in the form of the activity parameter whether the induction unit is in an activated state or a deactivated state. Alternatively or additionally the activity sensor element could detect in the form of the activity parameter for example a degree of activity of the induction unit, which could indicate in particular the heating power the induction unit supplies in the operating state, in particular to heat the cookware item. In particular the activity sensor element detects the activity parameter of the induction unit by detecting a voltage induced in the activity sensor element, which is induced in particular by an electromagnetic alternating field supplied by the induction unit.

A "temperature sensor element" refers in particular to a sensor element which, in at least one operating state, detects at least one temperature of at least one unit. In particular the temperature parameter of the unit characterizes at least one temperature of the unit. At least one unit could be for example the induction unit and/or the placement plate and/or the cookware item and/or at least one item to be cooked in the cookware item.

For example the control unit could be provided to determine a presence and/or absence of the object in particular as a function of the presence parameter and advantageously also as a function of the temperature parameter, in particular in the case of at least one small object. This in particular allows particularly precise detection of a presence and/or absence of the object.

"Provided" means in particular specifically programmed, designed and/or equipped. That an item is provided for a particular function means in particular that the item fulfils and/or performs said particular function in at least one application and/or operating state.

It is further proposed that, when looking at a perpendicular projection of a placement surface, which is at least defined by the induction unit, onto one plane, the sensor unit extends over a surface portion of at least 50%, in particular at least 60%, advantageously at least 70%, particularly advantageously at least 80%, preferably at least 90% and particularly preferably at least 95% of a surface spanned by the placement surface in the plane. When looking at a perpendicular projection of a placement surface onto one plane, the sensor unit particularly advantageously extends over an entire surface extension spanned by the placement surface in the plane. A "placement surface" refers in particular to a surface portion of the placement plate, which is provided for the placement of the object, in particular for the purpose of transferring energy to the object. The placement surface is advantageously configured as a cooking surface and is provided in particular for the placement of cookware, in particular for the purpose of heating the cookware. In particular in a mounted position at least a majority and advantageously all of the induction units are arranged below the placement surface. The placement surface is defined in particular by an arrangement of at least a majority and advantageously all of the induction units. When looking at a perpendicular projection of the placement surface and the induction units onto one plane, a surface spanned by the placement surface in the plane and a surface spanned by the induction units in the plane are congruent over a surface portion of at least 90%, in particular at least 92%, advantageously at least 95%, particularly advantageously at least 97%, preferably at least 99% and particularly preferably completely. This in particular allows detection of the sensor parameter over a majority of the placement surface, providing in particular a high level of operating convenience.

For example at least one, in particular at least a majority and advantageously each of the activity sensor elements and at least one, in particular at least a majority and advantageously each of the presence sensor elements could be configured differently from one another. Preferably at least one, in particular at least a majority and advantageously each of the activity sensor elements and at least one, in particular at least a majority and advantageously each of the presence sensor elements could be configured as a single piece with one another and in particular identically, in particular as one and the same element. "As a single piece" here in particular means connected at least with a material fit, for example by means of a welding process, an adhesion process, a spraying process and/or another process that appears expedient to the person skilled in the art, and/or advantageously formed in one piece, for example by being produced from one casting and/or being produced using a single or multiple component spraying method and advantageously from a single workpiece. This means in particular that few different parts and/or little storage capacity is required. In particular costs can be kept low, as in particular one sensor element can be used to detect at least two different parameters, in particular avoiding additional hardware costs.

It is further proposed that at least one, in particular at least a majority and advantageously each of the activity sensor elements and/or presence sensor elements respectively has at least one induction coil. In at least one mounted state at least one, in particular at least a majority and advantageously each of the activity sensor elements and/or presence sensor elements is arranged in particular in a resonant circuit, which is in particular part of the induction device. In particular the induction device has at least one resonant capacitor and in particular at least one electrical resistance, in particular an electrical cross resistance, in particular per activity sensor element and/or per presence sensor element, these being arranged in particular in series with the induction coil and advantageously in the resonant circuit. In the case of presence sensor elements in particular the sensor unit detects the sensor parameter in the form of a presence parameter in particular by means of a change in a resonant frequency of the induction coil and/or by means of a change in a resonant frequency of the resonant circuit and/or by means of a change in an inductance of the induction coil. This in particular allows optimal detection of the sensor parameter in a structurally simple manner, allowing costs to be kept low and/or detection quality to be optimized.

For example at least one, in particular at least a majority and advantageously each of the activity sensor elements and/or presence sensor elements and at least one, in particular at least a majority and advantageously each of the temperature sensor elements could be configured as a single piece with one another and in particular identically. A respective temperature sensor element could be configured for example as a resistance wire, which is wound in particular into a coil and could in particular define the induction coil of the respective activity sensor element and/or the respective presence sensor element. Preferably at least one, in particular at least a majority and advantageously each of the activity sensor elements and/or presence sensor elements and at least one, in particular at least a majority and advantageously each of the temperature sensor elements could be configured differently from one another. This in particular allows a high level of flexibility, in particular in respect of an arrangement of the temperature sensor elements relative to the activity sensor elements and/or presence sensor elements. It can allow in particular simple and/or fast and/or economical production.

It is further proposed that at least one, in particular at least a majority and advantageously each of the activity sensor elements and/or presence sensor elements and at least one, in particular at least a majority and advantageously each of the temperature sensor elements are arranged on different layers of at least one substrate of the sensor unit. In particular at least one, in particular at least a majority and advantageously each of the activity sensor elements and/or presence sensor elements is arranged on a first layer of the substrate and at least one, in particular at least a majority and advantageously each of the temperature sensor elements is arranged on at least one second layer of the substrate located opposite the first layer of the substrate in relation to a main extension plane of the substrate. This in particular allows a compact embodiment to be achieved and/or reduces the number of different parts and/or storage capacity required.

It is also proposed that at least one, in particular at least a majority and advantageously each of the activity sensor elements and/or presence sensor elements and at least one, in particular at least a majority and advantageously each of the temperature sensor elements are connected electrically in series. In particular one of the activity sensor elements and/or presence sensor elements and one of the temperature sensor elements respectively are connected electrically in series. This simple electrical circuit allows optimal detection, which in particular allows fast and/or simple mounting.

It is further proposed that at least one, in particular at least a majority and advantageously each of the activity sensor elements and/or presence sensor elements and at least one, in particular at least a majority and advantageously each of the temperature sensor elements are configured as a single piece with one another. In particular one of the activity sensor elements and/or presence sensor elements and at least one of the temperature sensor elements respectively are configured as a single piece with one another. At least one, in particular at least a majority and advantageously each of the activity sensor elements and/or presence sensor elements in particular has at least one electrical conduction element, which is wound in particular into the induction coil and is configured in particular as a thermistor or RTD (resistance temperature detector) and forms the temperature sensor element. This in particular reduces the number of different parts and/or storage capacity required.

It is further proposed that, when looking at a perpendicular projection of the sensor unit onto one plane, said plane being aligned in particular parallel to a main extension plane of the placement plate and/or to a main extension plane of the induction unit, at least one, in particular at least a majority and advantageously each of the activity sensor elements and/or presence sensor elements and at least one, in particular at least a majority and advantageously each of the temperature sensor elements are arranged so that they overlap at least in sections, in particular at least largely and advantageously completely. The expression that at least two items, in particular at least one of the activity sensor elements and/or presence sensor elements and at least one of the temperature sensor elements are arranged so that they "overlap at least in sections" when looking at a perpendicular projection of the sensor unit onto one plane means in particular that, when looking at a perpendicular projection of the sensor unit onto one plane, the items are arranged so that they overlap over a surface portion of at least 30%, in particular at least 50%, advantageously at least 70%, particularly advantageously at least 80%, preferably at least 90% and particularly preferably at least 95% of a surface of one of the smaller items in the plane. This in particular ensures identical resolution capacity when detecting the presence parameter and/or activity parameter and the temperature parameter, resulting in particular in a high level of operating convenience.

For example at least a majority and advantageously all of the activity sensor elements and/or presence sensor elements and/or temperature sensor elements could be arranged on different substrates and the substrates could be arranged so that they overlap one another. Preferably at least a majority and advantageously all of the activity sensor elements and/or presence sensor elements and/or temperature sensor elements are arranged on the same substrate, thereby in particular reducing the number of different parts and/or storage capacity required and/or minimizing hardware costs.

It is also proposed that at least one, in particular at least a majority and advantageously each of the temperature sensor elements is configured as a thermistor or RTD. The thermistor is in particular a resistance thermometer and could be configured for example as a high-temperature conductor and/or a low-temperature conductor. This in particular allows precise detection of the temperature parameter, thereby allowing in particular optimal cooking results and/or a high level of operating convenience.

A number of activity sensor elements and/or presence sensor elements and a number of temperature sensor elements could be different from one another for example. A number of activity sensor elements and/or presence sensor elements and a number of temperature sensor elements are preferably identical. In particular just one temperature sensor element is assigned in particular to one of the activity sensor elements and/or presence sensor elements respectively. A number of activity sensor elements and/or presence sensor elements and/or temperature sensor elements is in particular greater and advantageously substantially greater than a number of induction units. This allows a high level of operating convenience to be achieved and/or simple assignment of a detected temperature parameter to a detected activity parameter and/or to a detected presence parameter.

It is further proposed that, when looking at a perpendicular projection of the sensor unit onto one plane, at least one, in particular at least a majority and advantageously each of the activity sensor elements and/or presence sensor elements and/or temperature sensor elements respectively has a surface extension of maximum 25 cm$^2$, in particular maximum 20 cm$^2$, advantageously maximum 15 cm$^2$, particularly advantageously maximum 12 cm$^2$, preferably maximum 10 cm$^2$, and particularly preferably maximum 9 cm$^2$ in the plane. In particular at least one, in particular at least a majority and advantageously each of the sensor elements, in particular the activity sensor elements and/or presence sensor elements and/or temperature sensor elements, could be of a size that could be tailored in particular to an object and/or item to be detected. This in particular allows a greater spatial resolution capacity to be achieved, the smaller the size of the sensor elements, allowing in particular precise detection of small objects and/or outlines and/or configurations of objects. This in particular allows a high resolution capacity to be achieved, thereby allowing in particular even small and/or minimal sizes to be detected to be detected. In the case of the presence sensor elements for example in particular a shape and/or configuration of even very small objects can be detected easily. Compared with sensor elements formed in particular by the induction units, in particular a fraction of the energy has to be transferred to the item to be detected, thereby minimizing and/or completely eliminating unwanted heating of the item to be detected. In the case of the temperature sensor elements for example hazardous situations in particular can be avoided or at least reduced by the high resolution capacity, in particular in the case of an automatic cooking operation.

Particularly advantageous properties in respect of detection of a sensor parameter can be achieved in particular by an induction appliance, in particular by an induction cooktop, with at least one inventive induction device.

The induction device here is not limited to the application and embodiment described above. In particular the induction device can have a different number of individual elements, parts and units from the number cited herein to comply with the mode of operation described herein.

Further advantages will emerge from the description of the drawing that follows. The drawing shows exemplary embodiments of the invention. The drawing, description and claims contain numerous features in combination. The person skilled in the art will also expediently consider the features individually and combine them in useful further combinations.

DETAILED DESCRIPTION OF EXEMPLARY EMBODIMENTS OF THE PRESENT INVENTION

Figure 1:
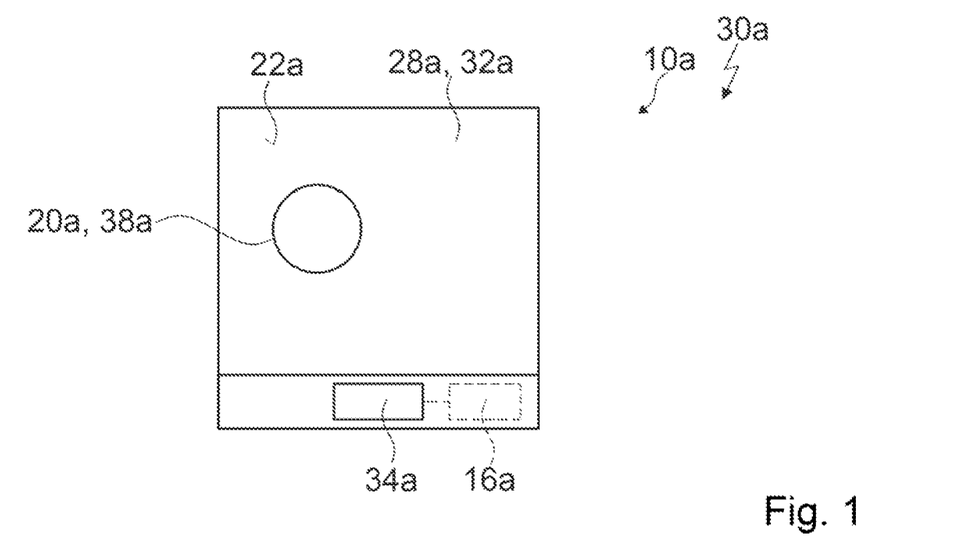
FIG. 1 shows a schematic top view of an induction appliance with an induction device.

FIG. 1 shows an induction appliance 30a in the form of an induction cooktop, with an induction device 10a in the form of an induction cooktop device. In an alternative exemplary embodiment the induction appliance 30a and/or the induction device 10a could be configured for example to transfer energy inductively to an item (not shown) that is not a cookware item 38a. The item could be for example a self-driving work implement and/or a hand tool and/or a shutter and/or a remote control unit.

The induction device 10a has a placement plate 32a. In the present exemplary embodiment the placement plate 32a is in the form of a cooktop plate. In a mounted state the placement plate 32a forms part of a cooktop outer housing, in particular a cooktop outer housing in particular of the induction appliance 30a. The placement plate 32a is provided for the placement of cookware 38a (see FIG. 2).

Figure 2:
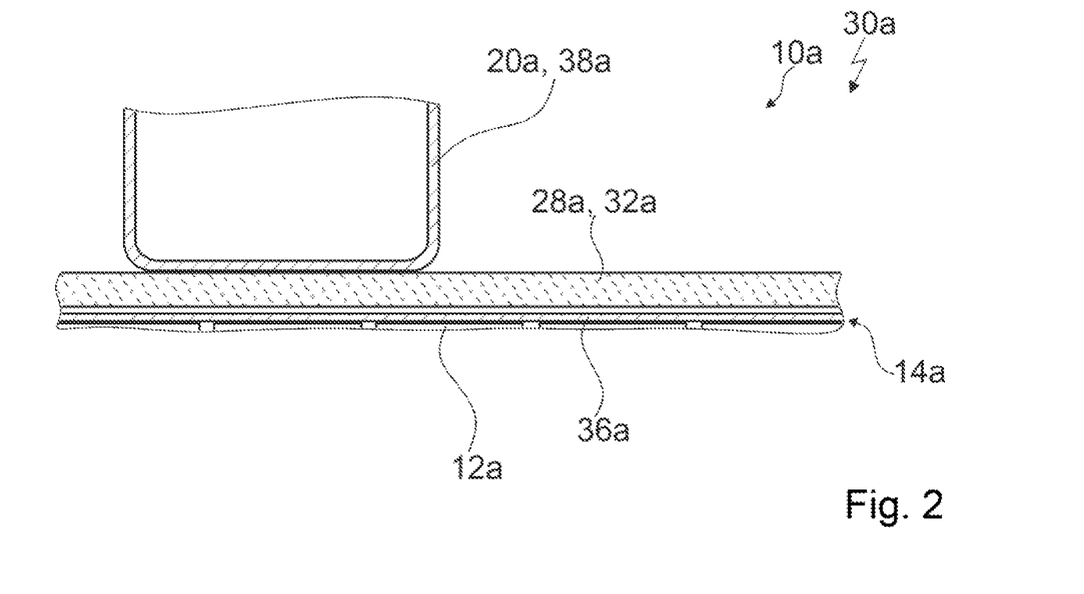
FIG. 2 shows a schematic sectional view of a detail of the induction appliance with the induction device.

The induction device 10a has a plurality of induction units 12a for heating cookware 38a (see FIG. 2). Only one of a number of items present is shown with a reference character in each instance in the figures. The induction units 12a together define a placement surface 22a. When the induction units 12a and the placement surface 22a are projected in a perpendicular manner into one plane, in the present exemplary embodiment a surface spanned by the induction units 12a in the plane and a surface spanned by the placement surface 22a in the plane are substantially congruent. Only one of the induction units 12a is described in the following.

In a mounted position the induction unit 12a is arranged below the placement plate 32a. The induction unit 12a is provided to heat cookware 38a positioned on the placement plate 32a above the induction unit 12a. In the present exemplary embodiment the induction unit 12a is configured as an induction heating unit.

The induction device 10a has an operator interface 34a for inputting and/or selecting operating parameters (see FIG. 1), for example a heating power and/or heating power density and/or a heating zone. The operator interface 34a is provided to output a value of an operating parameter to an operator.

The induction device 10a comprises a control unit 16a. The control unit 16a is provided to perform actions and/or change settings as a function of operating parameters input by means of the operator interface 34a. In an operating state the control unit 16a regulates an energy supply to the induction unit 12a.

The control unit 16a is provided to analyze and/or process at least one sensor parameter detected by a sensor unit 14a. The induction device 10a comprises the sensor unit 14a (see FIGS. 2 to 6). In a mounted position the sensor unit 14a is arranged below the placement plate 32a (see FIG. 2). In a mounted position the sensor unit 14a is arranged above the induction unit 12a. In a mounted position the sensor unit 14a is arranged between the induction unit 12a and the placement plate 32a.

When looking at a perpendicular projection of the placement surface 22a, which is defined at least by the induction unit 12a, onto one plane, the sensor unit 14a extends over a surface portion of substantially 100% of a surface spanned by the placement surface 22a in the plane. When the sensor unit 14a and placement surface 22a are extended in a perpendicular manner into one plane, in the present exemplary embodiment a surface spanned by the sensor unit 14a in the plane and a surface spanned by the placement surface 22a in the plane are substantially congruent.

The sensor unit 14a is provided to detect at least one sensor parameter. In the present exemplary embodiment the sensor unit 14a is provided to detect at least three different sensor parameters, in particular at least three different sorts and/or types of sensor parameter. To detect the three different sorts and/or types of sensor parameter the sensor unit 14a has three sensor elements 18a, 24a, 26a, each being provided to detect one of the different sorts and/or types of sensor parameter.

The sensor unit 14a has a substrate 36a (see FIGS. 2 to 8). The sensor elements 18a, 24a, 26a are arranged on the substrate 36a. For example the sensor elements 18a, 24a, 26a could be printed onto the substrate 36a and/or applied to the substrate 36a by coating.

Figure 3:
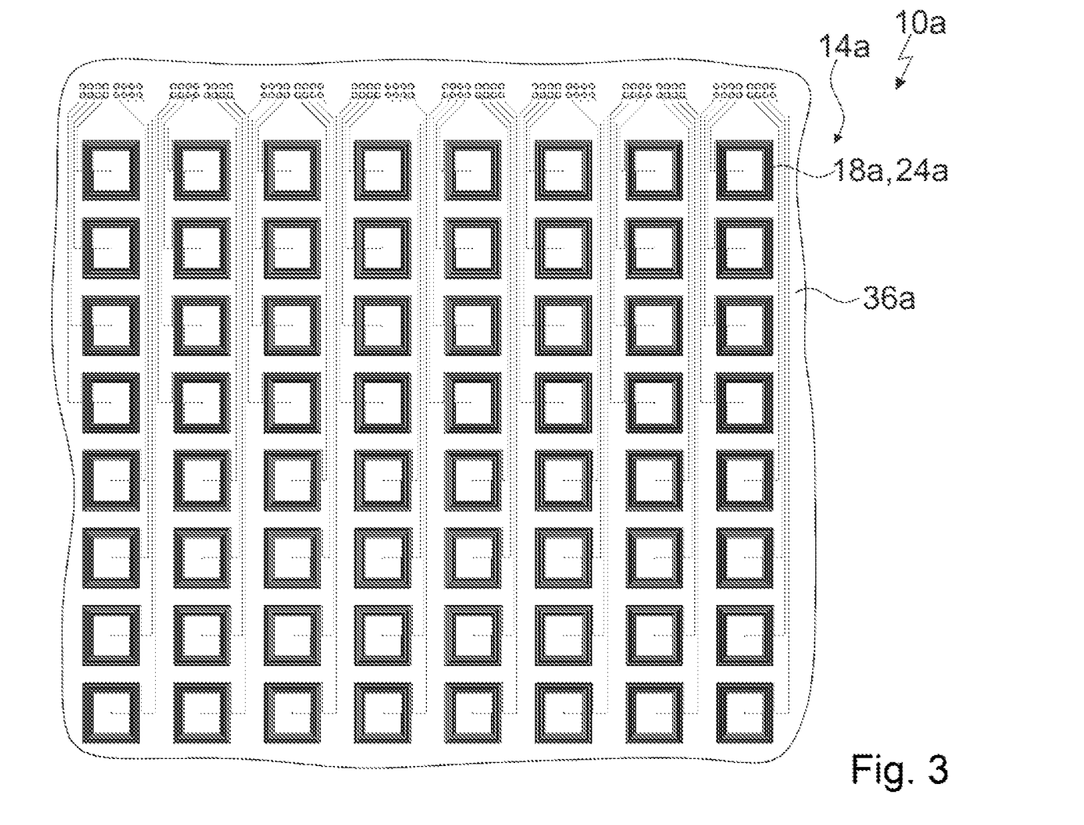
FIG. 3 shows a schematic top view of a detail of a sensor unit of the induction device with a plurality of presence sensor elements and activity sensor elements.
Figure 4:
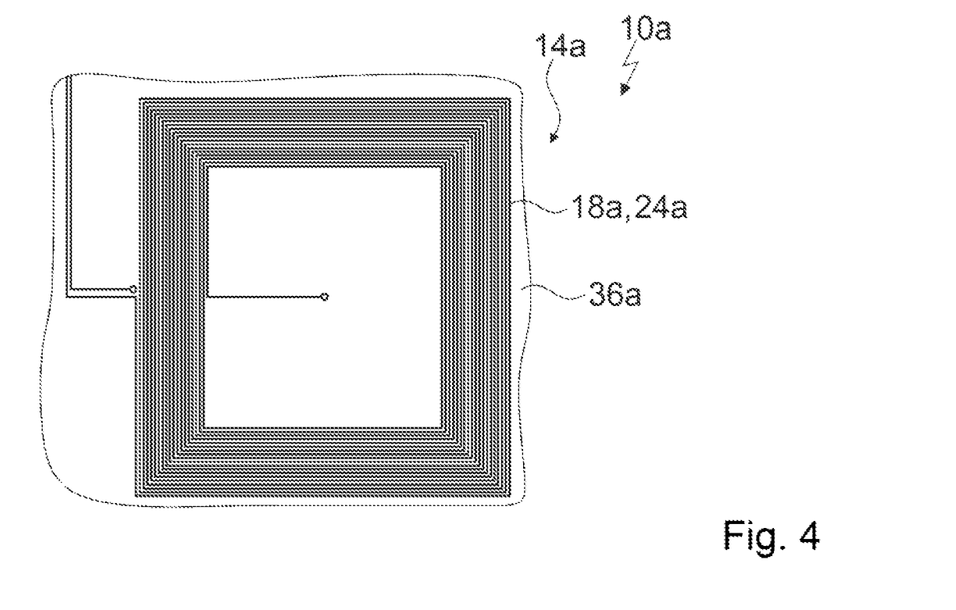
FIG. 4 shows an enlarged schematic view of one of the presence sensor elements and one of the activity sensor elements from FIG. 3.

The sensor unit 14a has a plurality of presence sensor elements 18a arranged in a distributed manner (see FIGS. 3 and 4). In the present exemplary embodiment the presence sensor elements 18a are arranged in the manner of a matrix. A number of presence sensor elements 18a is substantially greater than a number of induction units 12a.

The presence sensor elements 18a are provided to detect at least one sensor parameter in the form of a presence parameter of at least one object 20a. The object 20a is part of the induction device 10a. In the present exemplary embodiment at least one object 20a is the cookware 38a. The presence sensor elements 18a are provided to detect at least one sensor parameter in the form of a presence parameter of the cookware 38a. In the operating state the presence sensor elements 18a detect at least one sensor parameter in the form of a presence parameter of the object 20a and/or the cookware 38a.

Each of the presence sensor elements 18a has at least one induction coil. In the operating state the presence sensor elements 18a detect the sensor parameter in the form of a presence parameter of the object 20a and/or the cookware 38a by means of a change in an impedance and/or a resonant frequency of the induction coil.

The sensor unit 14a has a plurality of activity sensor elements 24a arranged in a distributed manner (see FIGS. 3 and 4). In the present exemplary embodiment the activity sensor elements 24a are arranged in the manner of a matrix. A number of activity sensor elements 24a is substantially greater than a number of induction units 12a.

The activity sensor elements 24a are provided to detect at least one sensor parameter in the form of an activity parameter of the induction unit 12a. In the operating state the activity sensor elements 24a detect at least one sensor parameter in the form of an activity parameter of the induction unit 12a. Each of the activity sensor elements 24a has at least one induction coil.

A number of activity sensor elements 24a and a number of presence sensor elements 18a are identical. The activity sensor elements 24a and the presence sensor elements 18a are configured as a single piece with one another. One of the activity sensor elements 24a and one of the presence sensor elements 18a respectively are configured as a single piece with one another.

Figure 5:
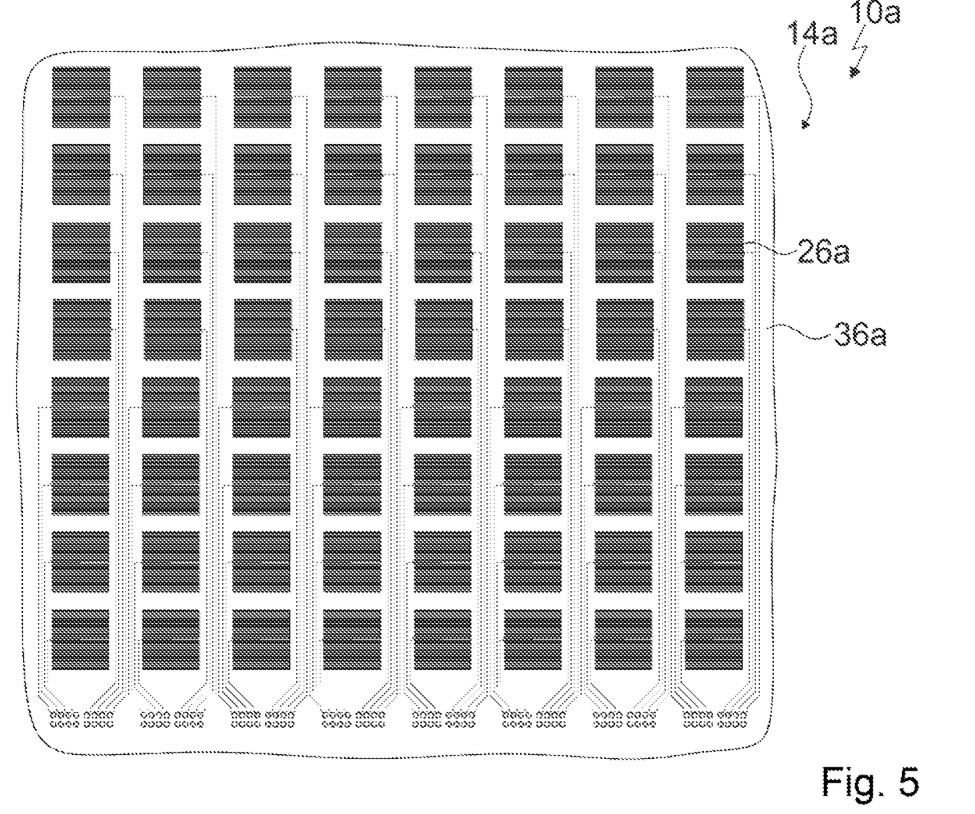
FIG. 5 shows a schematic top view of a detail of the sensor unit with a plurality of temperature sensor elements, omitting the electrical connection of the temperature sensor elements.
Figure 6:
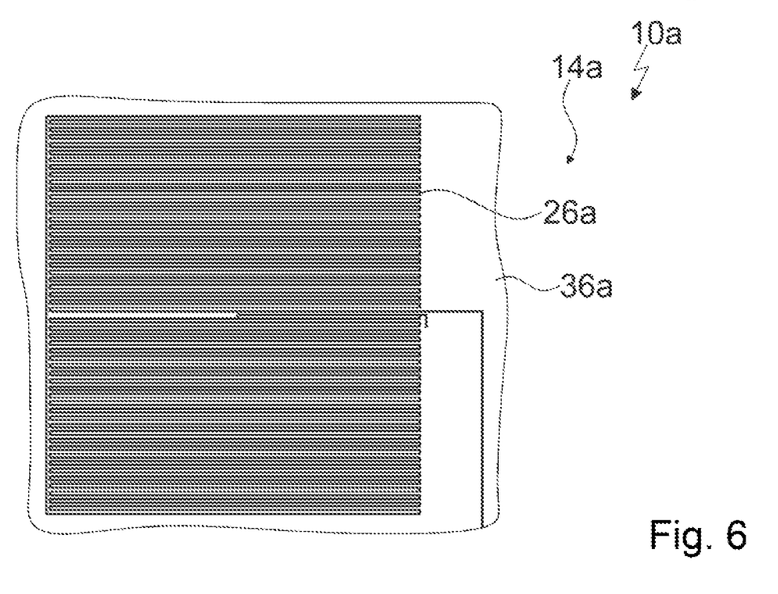
FIG. 6 shows an enlarged schematic view of one of the plurality of temperature sensor elements.

The sensor unit 14a has a plurality of temperature sensor elements 26a arranged in a distributed manner (see FIGS. 5 and 6). In the present exemplary embodiment the temperature sensor elements 26a are arranged in the manner of a matrix. A number of temperature sensor elements 26a is substantially greater than a number of induction units 12a.

The temperature sensor elements 26a are provided to detect at least one sensor parameter in the form of a temperature parameter of at least one unit 28a. In the operating state the temperature sensor elements 26a detect at least one sensor parameter in the form of a temperature parameter of at least one unit 28a.

The unit 28a is part of the induction device 10a. In the present exemplary embodiment at least one unit 28a is the placement plate 32a. The temperature sensor elements 26a are provided to detect at least one sensor parameter in the form of a temperature parameter of the placement plate 32a. In the operating state the temperature sensor elements 26a detect at least one sensor parameter in the form of a temperature parameter of the unit 28a and/or the placement plate 32a. Each of the temperature sensor elements 26a is configured as an RTD. In the operating state the temperature sensor elements 26 detect the sensor parameter in the form of a temperature parameter of the unit 28a and/or the placement plate 32a by means of a change in an electrical resistance of the respective temperature sensor element 26a as a function of a temperature.

A number of activity sensor elements 24a and a number of temperature sensor elements 26a are identical. A number of presence sensor elements 18a and a number of temperature sensor elements 26a are identical.

One of the presence sensor elements 18a and one of the temperature sensor elements 26a respectively are configured differently from one another. One of the activity sensor elements 24a and one of the temperature sensor elements 26a respectively are configured differently from one another. Each of the presence sensor elements 18a and each of the temperature sensor elements 26a are configured differently from one another. Each of the activity sensor elements 24a and each of the temperature sensor elements 26a are configured differently from one another.

In the present exemplary embodiment one of the presence sensor elements 18a and one of the temperature sensor elements 26a respectively are arranged on different layers of the substrate 36a of the sensor unit 14a. One of the activity sensor elements 24a and one of the temperature sensor elements 26a respectively are arranged on different layers of the substrate 36a of the sensor unit 14a. Each of the presence sensor elements 18a and each of the temperature sensor elements 26a are arranged on different layers of the substrate 36a of the sensor unit 14a. Each of the activity sensor elements 24a and each of the temperature sensor elements 26a are arranged on different layers of the substrate 36a of the sensor unit 14a.

Figure 7:
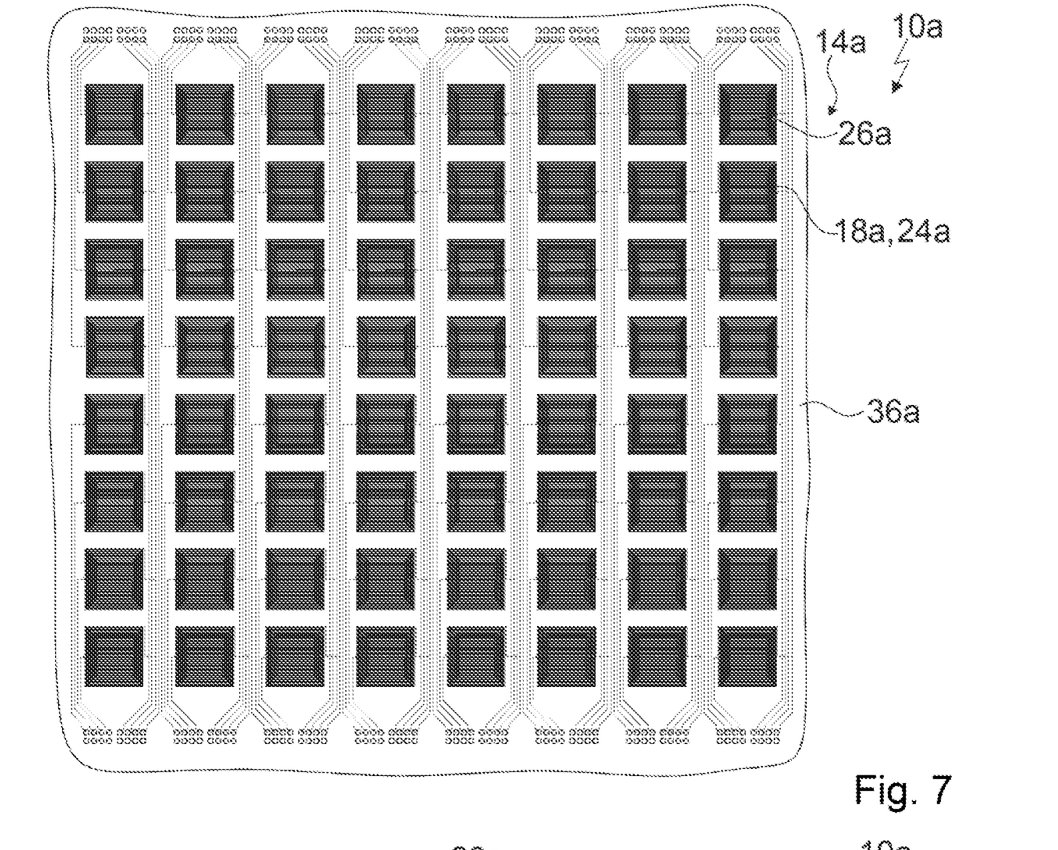
FIG. 7 shows a schematic top view of a detail of the sensor unit with the presence sensor elements, activity sensor elements and temperature sensor elements, a substrate of the sensor unit being shown as transparent.
Figure 8:
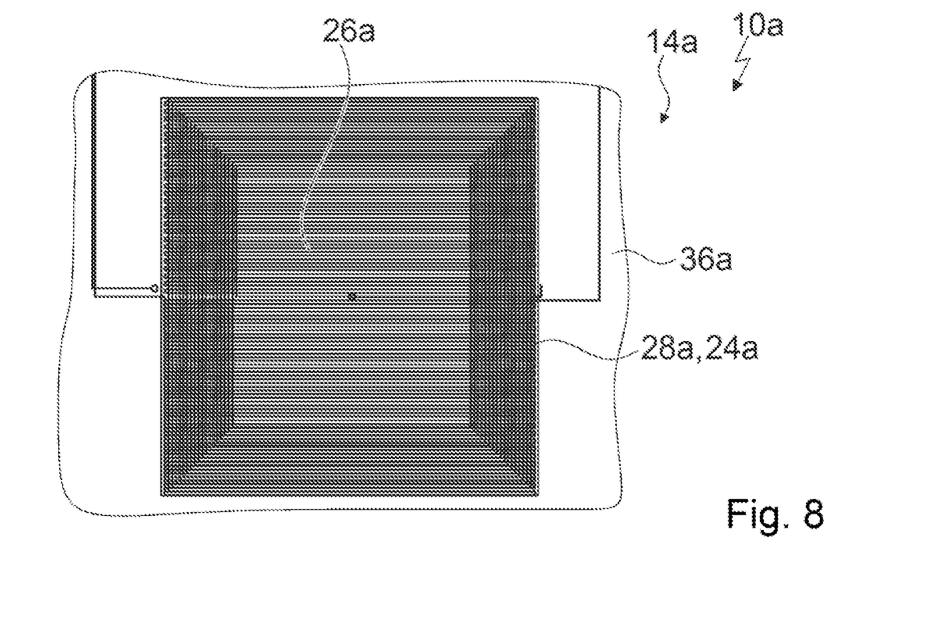
FIG. 8 shows a schematic view of an enlarged detail from FIG. 7.

When looking at a perpendicular projection of the sensor unit 14a onto one plane, one of the activity sensor elements 24a and one of the temperature sensor elements 26a respectively are arranged so that they overlap in sections and advantageously completely (see FIGS. 7 and 8). When looking at a perpendicular projection of the sensor unit 14a onto one plane, one of the presence sensor elements 18a and one of the temperature sensor elements 26a respectively are arranged so that they overlap in sections and advantageously completely.

In the present exemplary embodiment, when looking at a perpendicular projection of the sensor unit 14a onto one plane, each of the presence sensor elements 18a has a surface extension of substantially 9 cm$^2$ in the plane. When looking at a perpendicular projection of the sensor unit 12a onto one plane, each of the presence sensor elements 18a has a surface extension of substantially 3×3 cm$^2$ in the plane.

In the present exemplary embodiment, when looking at a perpendicular projection of the sensor unit 14a onto one plane, each of the activity sensor elements 24a has a surface extension of substantially 9 cm$^2$ in the plane. When looking at a perpendicular projection of the sensor unit 12a onto one plane, each of the activity sensor elements 24a has a surface extension of substantially 3×3 cm$^2$ in the plane.

In the present exemplary embodiment, when looking at a perpendicular projection of the sensor unit 14a onto one plane, each of the temperature sensor elements 26a has a surface extension of substantially 9 cm$^2$ in the plane. When looking at a perpendicular projection of the sensor unit 12a onto one plane, each of the temperature sensor elements 26a has a surface extension of substantially 3×3 cm$^2$ in the plane.

Figure 9:
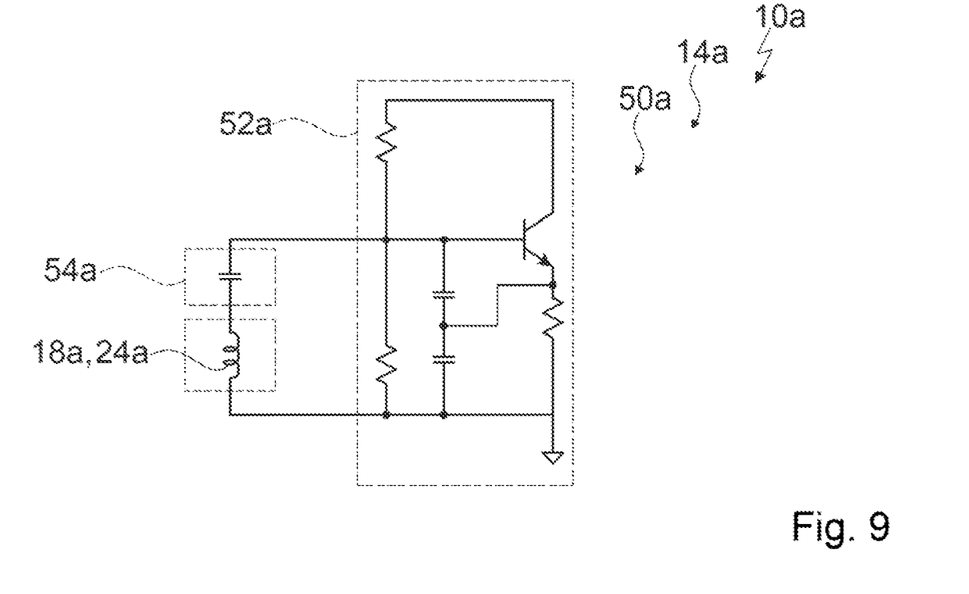
FIG. 9 shows a schematic view of a resonant circuit of the sensor unit.

The sensor unit 14a has a plurality of electrical resonant circuits 50a (see FIG. 9). In the present exemplary embodiment the sensor unit 14a has one electrical resonant circuit 50a per presence sensor element 18a. Only the illustrated resonant circuit 50a is described in the following.

The sensor unit 14a in particular has one resonant capacitance 54a per resonant circuit 50a. The resonant capacitance 54a and the presence sensor element 18a, in particular the induction coil of the presence sensor element 18a, are connected electrically in series. In the present exemplary embodiment the resonant capacitance 54a is configured as a capacitor.

The sensor unit 14a has one oscillator 52a, in particular per resonant circuit 50a. In the present exemplary embodiment the oscillator 52a comprises a Clapp oscillator.

One of the presence sensor elements 18a, the resonant capacitance 54a and the oscillator 52a are part of the resonant circuit 50a. When an object 20a approaches the presence sensor element 18a, the presence sensor element 18a detects the object 20a, in particular by means of a change, advantageously by means of an increase, in an inductance of the induction coil.

Figure 10:
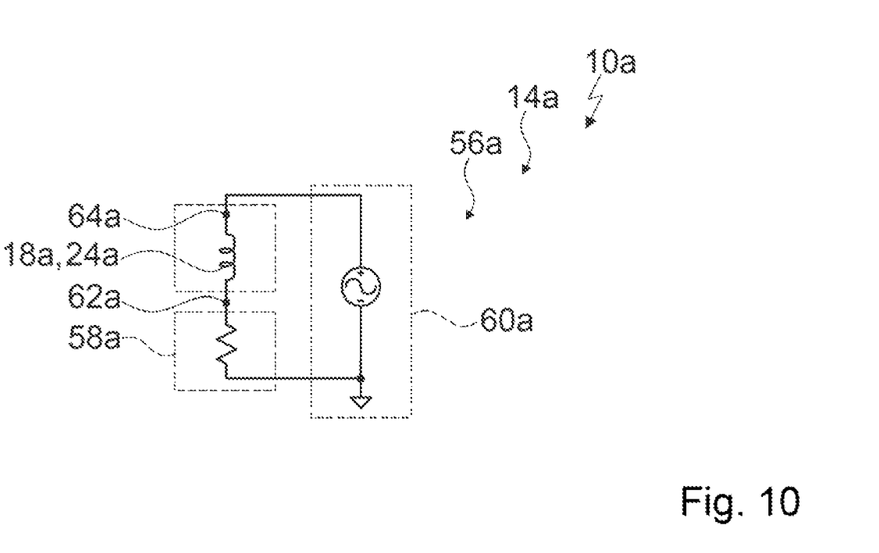
FIG. 10 shows a schematic view of a driver circuit of the sensor unit.

The sensor unit 14a has a plurality of electrical driver circuits 56a (see FIG. 10). In the present exemplary embodiment the sensor unit 14a has one electrical driver circuit 56a per presence sensor element 18a. Only the illustrated driver circuit 56a is described in the following.

The sensor unit 14a has one electrical resistance 58a, in particular per driver circuit 56a. The electrical resistance 58a and the presence sensor element 18a, in particular the induction coil of the presence sensor element 18a, are connected electrically in series. In the present exemplary embodiment the electrical resistance 58a is configured as an electrical cross resistance.

The sensor unit 14a has one energy source 60a, in particular per driver circuit 56a. The energy source 60a is provided to supply electrical energy for the presence sensor element 18a. In the operating state the control unit 16a operates the presence sensor element 18a, in particular by means of the energy source 60a, at a fixed frequency. In the operating state the control unit 16*a* detects an impedance of the presence sensor element 18*a*.

When an object 20*a* approaches the presence sensor element 18*a*, the presence sensor element 18*a* detects the object 20*a* in particular by means of a change, advantageously by means of an increase, in an inductance of the induction coil.

In the operating state the control unit 16*a* detects an electric voltage at a first measurement point 62*a*, which is located on a side of the presence sensor element 18*a* facing the resistance 58*a*. In the operating state the control unit 16*a* detects an electric voltage at a second measurement point 64*a*, which is located on a side of the presence sensor element 18*a* facing away from the resistance 58*a*. In the operating state the control unit 16*a* calculates an impedance of the presence sensor element 18*a* from the detected electric voltages and from the electrical resistance 58*a*.

It is assumed in the following that the electric voltage at the first measurement point 62*a* is V1 and the electric voltage at the second measurement point 64*a* is V2 and Rs is the electrical resistance 58*a*. In the operating state the control unit 16*a* determines an impedance Z of the presence sensor element 18*a* using the following formula:

$$Z=Rs(V2-V1)/V1 \quad 1.$$

Figure 11:
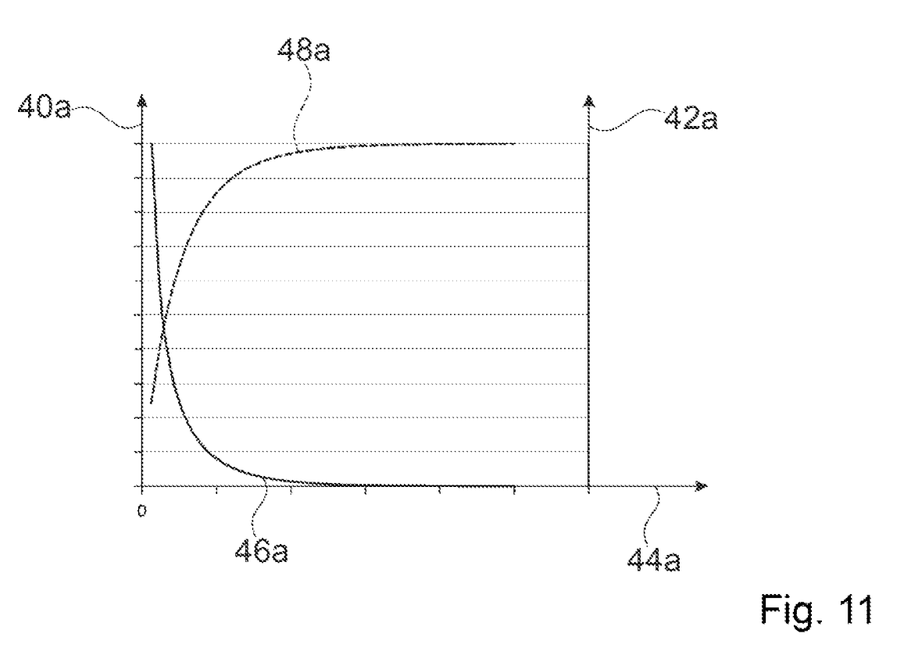
FIG. 11 shows a diagram showing a schematic view of normalized inductance and normalized frequency plotted respectively over a normalized distance between the sensor unit and an object.

FIG. 11 shows a diagram, in which a normalized inductance of one of the induction coils and a normalized frequency are plotted respectively over a normalized distance between the sensor unit 14*a* and the object 20*a*. On a first y-axis 40*a* an inductance of one of the induction coils is plotted relative to an inductance of the induction coil in the absence of the object 20*a*. On a second y-axis 42*a* a frequency of one of the induction coils is plotted relative to a frequency of the induction coil in the absence of the object 20*a*. On an x-axis 44*a* a distance between the sensor unit 14*a* and the object 20*a* is plotted relative to a maximum extension of one of the sensor elements 18*a*, 24*a*, 26*a*. In the present exemplary embodiment the maximum extension of one of the sensor elements 18*a*, 24*a*, 26*a* is substantially 3 cm.

A continuous progression curve 48*a* shows a progression of the normalized inductance of one of the induction coils. A broken progression curve 46*a* shows a progression of the normalized frequency of one of the induction coils.

It can be seen from FIG. 11 that the nearer the object 20*a* comes to the sensor unit 14*a*, the smaller the inductance of the induction coil. For example in the case of a normalized distance of 0.1, which in the present exemplary embodiment corresponds in particular to a distance of substantially 3 mm between the object 20*a* and the sensor unit 14*a*, the inductance of the induction coil has a value of approximately 50% of the value of the inductance of the induction coil when the object 20*a* is substantially 30 mm away from the sensor unit 14*a*.

It can be seen from FIG. 11 that the nearer the object 20*a* comes to the sensor unit 14*a*, the higher the frequency of the induction coil, in particular due to the decreasing inductance of the induction coil.

Figure 12:
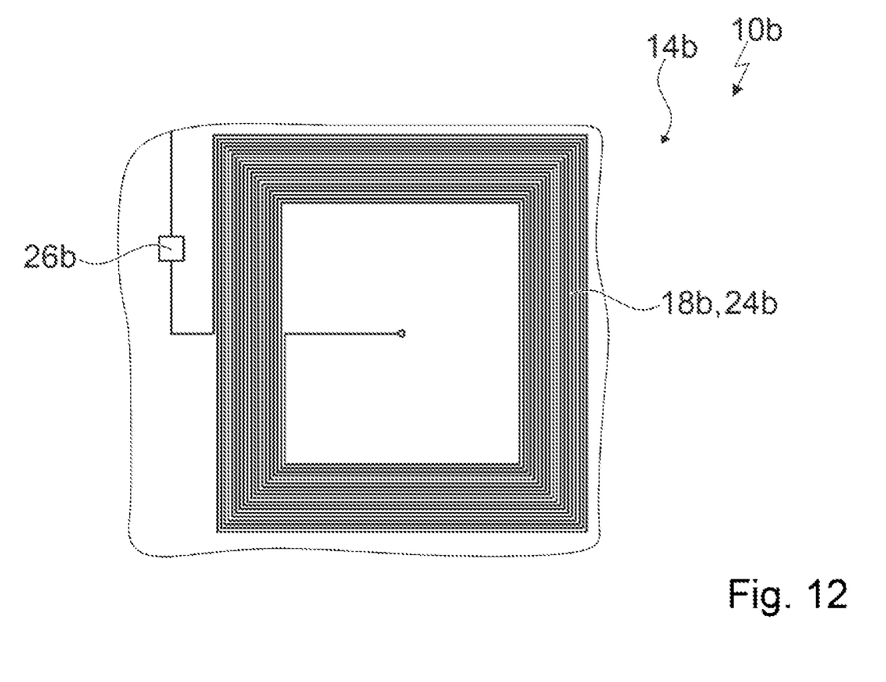
FIG. 12 shows a schematic top view of a presence sensor element, an activity sensor element and a temperature sensor element of a sensor unit of an alternative induction device.
Figure 13:
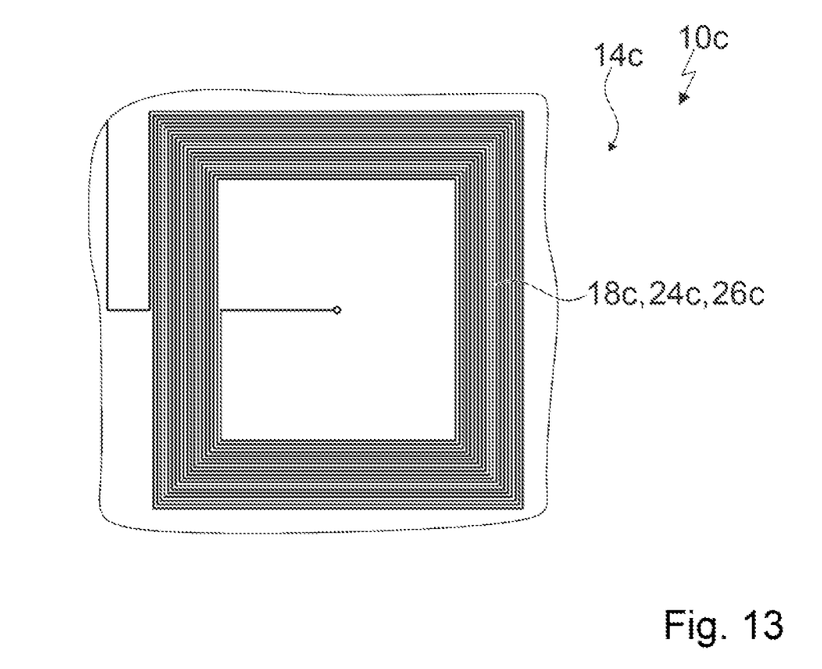
FIG. 13 shows a schematic top view of a presence sensor element, an activity sensor element and a temperature sensor element of a sensor unit of an alternative induction device.

FIGS. 12 and 13 show further exemplary embodiments of the invention. The descriptions that follow are essentially limited to the differences between the exemplary embodiments, it being possible to refer to the description of the exemplary embodiment in FIGS. 1 to 11 for parts, features and functions that remain the same. To distinguish between the exemplary embodiments, the letter a in the reference characters of the exemplary embodiment in FIGS. 1 to 11 is replaced by the letters b and c in the reference characters of the exemplary embodiment in FIGS. 12 and 13. It is possible in principle also to refer to the drawings and/or description of the exemplary embodiment in FIGS. 1 to 11 for parts with the same designation, in particular for parts with the same reference characters.

FIG. 12 shows a detail of a sensor unit 14*b* of an alternative induction device 10*b*. The sensor unit 14*b* has a plurality of presence sensor elements 18*b*, a plurality of activity sensor elements 24*b* and a plurality of temperature sensor elements 26*a*, only one of each of which is shown. One of the presence sensor elements 18*b* and one of the activity sensor elements 24*b* respectively are configured as a single piece with one another.

One of the presence sensor elements 18*b* and one of the temperature sensor elements 26*b* respectively are configured differently from one another. One of the activity sensor elements 24*b* and one of the temperature sensor elements 26*b* respectively are configured differently from one another. Each of the presence sensor elements 18*b* and each of the temperature sensor elements 26*b* are configured differently from one another. Each of the activity sensor elements 24*b* and each of the temperature sensor elements 26*b* are configured differently from one another.

In the present exemplary embodiment one of the presence sensor elements 18*b* and one of the temperature sensor elements 26*b* respectively are connected electrically in series. One of the activity sensor elements 24*b* and one of the temperature sensor elements 26*b* respectively are connected electrically in series.

FIG. 13 shows a detail of a sensor unit 14*c* of an alternative induction device 10*c*. The sensor unit 14*c* has a plurality of presence sensor elements 18*c*, a plurality of activity sensor elements 24*c* and a plurality of temperature sensor elements 26*c*, only one of each of which is shown. One of the presence sensor elements 18*c* and one of the activity sensor elements 24*c* respectively are configured as a single piece with one another. One of the presence sensor elements 18*c* and one of the temperature sensor elements 26*c* respectively are configured as a single piece with one another. One of the activity sensor elements 24*c* and one of the temperature sensor elements 26*c* respectively are configured as a single piece with one another.

The invention claimed is:

1. An induction device, comprising:
   an induction unit;
   a sensor unit which is arranged above and separate from the induction unit in a mounted position and includes a plurality of presence sensor elements arranged in a distributed manner and configured to detect a sensor parameter in the form of a presence parameter of an object; and
   a control unit configured to analyze the sensor parameter,
   wherein the sensor unit includes a plurality of activity sensor elements arranged in a distributed manner and configured to detect at least one sensor parameter in the form of an activity parameter of the induction unit,
   the activity parameter is whether the induction unit is in an activated state,
   the sensor unit includes a plurality of temperature sensor elements arranged in a distributed manner and configured to detect at least one sensor parameter in the form of a temperature parameter of at least one unit, and
   at least one of the presence sensor elements and at least one of the temperature sensor elements are arranged on different layers of at least one substrate of the sensor unit.

2. The induction device of claim 1, constructed in the form of an induction cooktop device.

3. The induction device of claim 1, wherein, when looking at a perpendicular projection of a placement surface, which is at least defined by the induction unit, onto one plane, the sensor unit extends over a surface portion of at least 50% of a surface spanned by the placement surface in the plane.

4. The induction device of claim 1, wherein at least one of the activity sensor elements and at least one of the presence sensor elements are configured as a single piece with one another.

5. The induction device of claim 1, wherein at least one of the presence sensor elements has at least one induction coil.

6. The induction device of claim 1, wherein at least one of the presence sensor elements and at least one of the temperature sensor elements are connected electrically in series.

7. The induction device of claim 1, wherein, when looking at a perpendicular projection of the sensor unit onto one plane, at least one of the presence sensor elements and at least one of the temperature sensor elements are arranged so that they overlap at least in one section.

8. The induction device of claim 1, wherein at least one of the temperature sensor elements is configured as a thermistor or RTD.

9. The induction device of claim 1, wherein a number of presence sensor elements and a number of temperature sensor elements are identical.

10. The induction device of claim 1, wherein, when looking at a perpendicular projection of the sensor unit onto one plane, at least one of the presence sensor elements has a surface extension of maximum 25 cm² in the plane.

11. An induction appliance, comprising an induction device, said induction device comprising an induction unit;

a sensor unit which is arranged above and separate from the induction unit in a mounted position and includes a plurality of presence sensor elements arranged in a distributed manner and configured to detect a sensor parameter in the form of a presence parameter of an object; and a control unit configured to analyze the sensor parameter, wherein the sensor unit includes a plurality of activity sensor elements arranged in a distributed manner and configured to detect at least one sensor parameter in the form of an activity parameter of the induction unit, the activity parameter is whether the induction unit is in an activated state, the sensor unit includes a plurality of temperature sensor elements arranged in a distributed manner and configured to detect at least one sensor parameter in the form of a temperature parameter of at least one unit, and at least one of the presence sensor elements and at least one of the temperature sensor elements are arranged on different layers of at least one substrate of the sensor unit.

12. The induction appliance of claim 11, constructed in the form of an induction cooktop.

13. The induction device of claim 1, wherein the activity sensor elements detect the activity parameter of the induction unit by detecting a voltage induced in the activity sensor element by an electromagnetic alternating field supplied by the induction unit.

* * * * *